United States Patent
Venkatraman et al.

(10) Patent No.: US 11,096,070 B2
(45) Date of Patent: *Aug. 17, 2021

(54) SYSTEM AND METHOD FOR A USAGE CATEGORY SPECIFIC SELF-ORGANIZING NETWORK

(71) Applicant: Verizon Patent and Licensing Inc., Arlington, VA (US)

(72) Inventors: Shankar Venkatraman, San Jose, CA (US); Lee K. Tjio, Danville, CA (US); Jin Yang, Orinda, CA (US); Vikram K. Rawat, Orinda, CA (US); Parvez Ahmad, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/263,748

(22) Filed: Jan. 31, 2019

(65) Prior Publication Data
US 2019/0166510 A1 May 30, 2019

Related U.S. Application Data

(62) Division of application No. 15/410,146, filed on Jan. 19, 2017, now Pat. No. 10,237,758.

(51) Int. Cl.
*H04W 24/02* (2009.01)
*H04L 29/08* (2006.01)
(Continued)

(52) U.S. Cl.
CPC .............. *H04W 24/02* (2013.01); *H04L 45/14* (2013.01); *H04L 47/29* (2013.01); *H04L 67/303* (2013.01);
(Continued)

(58) Field of Classification Search
CPC ....... H04W 24/02; H04W 40/24; H04W 4/70; H04W 8/22; H04W 24/08; H04W 84/18; H04L 47/29; H04L 45/14; H04L 67/303
See application file for complete search history.

(56) References Cited

U.S. PATENT DOCUMENTS

2009/0070417 A1  3/2009  Bao et al.
2009/0247162 A1* 10/2009  Yasuoka ............... H04W 36/32
                                                        455/436
(Continued)

*Primary Examiner* — Yuwen Pan
*Assistant Examiner* — Fatuma G Sherif

(57) ABSTRACT

A computer device may include a memory configured to store instructions and a processor configured to execute the instructions to select a base station; obtain one or more metric values for user equipment (UE) devices attached to the selected base station; and determine usage categories for at least some of the UE devices attached to the selected base station, wherein a usage category identifies a combination of a data type, a movement type, and a user type associated with a particular UE device. The processor may be further configured to execute the instructions to classify the obtained one or more metric values based on the determined usage categories; select one or more optimization actions for the selected base station based on the classified one or more metric values; and instruct the selected base station to perform the selected one or more optimization actions.

20 Claims, 10 Drawing Sheets

(51) Int. Cl.
*H04L 12/721* (2013.01)
*H04L 12/801* (2013.01)
*H04W 4/70* (2018.01)
*H04W 40/24* (2009.01)
*H04W 24/08* (2009.01)
*H04W 8/22* (2009.01)
*H04W 84/18* (2009.01)

(52) U.S. Cl.
CPC .............. *H04W 4/70* (2018.02); *H04W 40/24* (2013.01); *H04W 8/22* (2013.01); *H04W 24/08* (2013.01); *H04W 84/18* (2013.01)

(56) References Cited

U.S. PATENT DOCUMENTS

| | | | |
|---|---|---|---|
| 2013/0301602 A1* | 11/2013 | Uchino | H04W 72/1257 370/329 |
| 2014/0269269 A1 | 9/2014 | Kovvali et al. | |
| 2015/0094114 A1* | 4/2015 | Rao | H04W 52/245 455/522 |
| 2016/0105264 A1* | 4/2016 | Chen | H04L 5/0048 370/329 |
| 2016/0157252 A1* | 6/2016 | Lu | H04W 72/087 370/329 |
| 2017/0264688 A1 | 9/2017 | Sell et al. | |

\* cited by examiner

330 OR 560

| USAGE CATEGORY ID 612 | ACTION 620 |
|---|---|
| | ⋮ |
| | RESTRICTION 630 |
| | ⋮ |

| BASE STATION ID 642 | | ⋯ |
| TIME PERIOD 652 | ⋯ | |
| USAGE CATEGORY ID 662 | ⋯ | |
| UE DEVICE 672 | ⋯ | |
| METRIC VALUES 674 | | |

| | |
|---|---|
| VOICE 910 | NUMBER OF VOICE BEARERS IN LAST N ATTEMPTS > 0 |
| MOBILE BROADBAND 920 | NUMBER OF QOS BEARERS IN LAST N ATTEMPTS > 0 |
| MOBILE HIGH SPEED 930 | MAXIMUM DISTANCE CHANGE PER UNIT TIME < T1 |
| CONNECTED MASS TRANSIT 940 | MAXIMUM DISTANCE CHANGE PER UNIT TIME < T2 AND NUMBER OF USERS < T3 |
| AIRBORNE MTC DEVICE 950 | UE MEASUREMENT REPORTS PER UNIT TIME > T4 |
| | NUMBER OF UNIQUE CELLS IN MEASUREMENT REPORT > T5 |
| | MAXIMUM ELEVATION > T6 |
| | (MAX-MIN) ELEVATION WITHIN TIME WINDOW W > T7 |
| VIDEO FEED MTC DEVICE 960 | NUMBER OF VOICE BEARERS IN LAST N ATTEMPTS == 0 AND PACKET SIZE VARIABILITY <= T8 AND VARIANCE IN PACKET ARRIVAL TIMES < T9 |
| STATIONARY LOW RATE MTC DEVICE 970 | NUMBER OF HANDOVERS PER UNIT TIME < T10 AND MAXIMUM DISTANCE CHANGE PER UNIT TIME < T11 AND MAX BYTES PER UE ATTACH < T12 |
| BEST EFFORT 980 | NUMBER OF VOICE/QOS BEARERS IN LAST N ATTEMPTS == 0 |

FIG. 9

SYSTEM AND METHOD FOR A USAGE CATEGORY SPECIFIC SELF-ORGANIZING NETWORK

CROSS-REFERENCE TO RELATED APPLICATIONS

This application is a divisional of U.S. patent application Ser. No. 15/410,146 filed on Jan. 19, 2017, the contents of which are hereby incorporated herein by reference in their entirety.

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage and service a large number of devices. In order to maintain a quality of service across a network, or across multiple networks, the provider may need to take into account various conditions that vary across networks and/or devices.

BRIEF DESCRIPTION OF THE DRAWINGS

FIG. 6A is a diagram illustrating exemplary components of the optimization database of FIG. 3;

FIG. 6B is a diagram illustrating exemplary components of the metrics database of FIG. 4;

FIG. 9 is a diagram of an exemplary set of behavior patterns for different usage categories according to an implementation described herein.

DETAILED DESCRIPTION OF PREFERRED EMBODIMENTS

Figure 1:
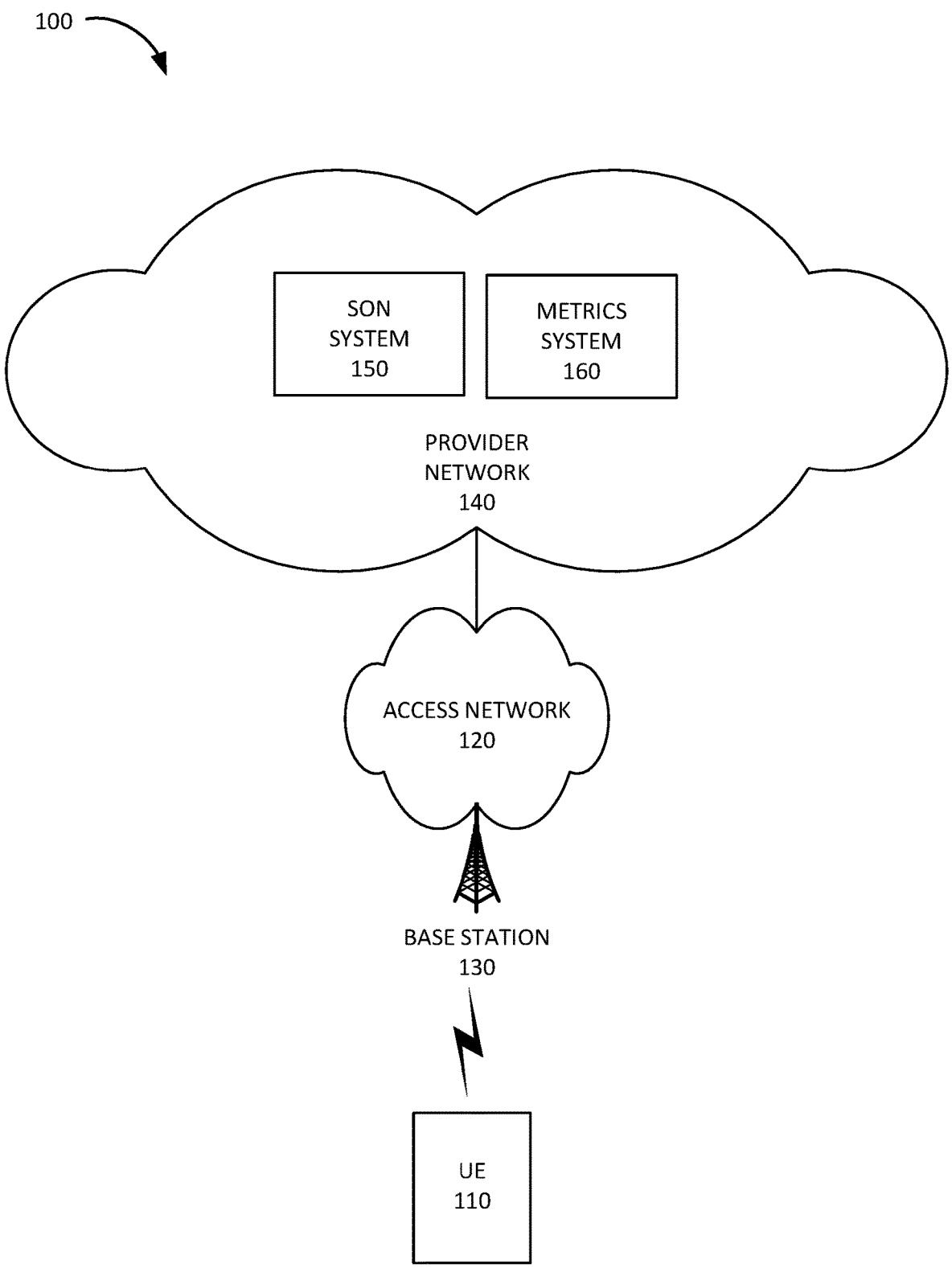
FIG. 1 is a diagram illustrating an environment according to an implementation described herein.

The following detailed description refers to the accompanying drawings. The same reference numbers in different drawings identify the same or similar elements.

A wireless access network may enable wireless communication devices to connect to a base station via wireless signals. A wireless communication device may connect to a provider network via the wireless access network and may use various applications, such as voice communication, video streaming, sending or receiving data via the Internet, etc. Furthermore, wireless communication devices may be mobile and may move out of communication range of a first base station and into the communication range of a second base station. In response, the wireless access network may handover control and service of a wireless communication device from the first base station to the second base station.

In the course of providing services to wireless communication devices, the operating conditions of the wireless access network may change. As an example, the number of wireless devices attached to a base station may increase and reduce the available capacity of the base station. As another example, a base station may experience fading of wireless signals on particular channels due to changes in the environment. As yet another example, a list of neighboring base stations, referred to as a "neighbor list," may change as base stations are added, removed, or changed. In the past, wireless networks had to be optimized manually in response to such changes.

Self-organizing networks (SONs) have enabled automation of optimization functions for wireless networks and may be deployed at a scale to manage wireless networks, such as 4G and 5G wireless networks. SON functions may be used to enable discovery and optimization of base station neighbor lists, modification of antenna tilts or directions to improve coverage or capacity, changes to handoff parameters to reduce handover drops, and/or other types of parameters that previously required laborious procedures to be executed manually.

SON functions may be carried out by obtaining various metrics, also referred to as key performance indicators (KPIs), across a large number of base stations and user equipment (UE) devices and to perform autonomous analysis on the obtained metrics. The result of the analysis may indicate a change in one or more parameters of a base station to optimize (i.e., improve) the functioning of the base station in response to changing conditions.

As the data traffic and number of UE devices using wireless access networks increase, the number of different types of UE devices and the number of different types of data also increase. As an example, an exponential growth in Internet of Things (IoT) applications leads to an increasing number of different types of UE devices employing machine-to-machine (M2M) communication, such as Machine-Type Communication (MTC), a type of M2M communication standard developed by the $3^{rd}$ Generation Partnership Project (3GPP). As another example, wireless communication is increasingly being used for new types of applications, such as connected cars, connected public transport systems, and drones. New types of UE devices and/or new types of use cases for wireless communication may challenge existing SON processes.

As an example, a large number of MTC drones, or a large number of stationary MTC devices, such as parking meters, may provide large amounts of data that could influence the operation of a SON optimization process and result in actions that skew the results and are not appropriate for other use cases, such as pedestrian mobile phone coverage, mobile vehicular traffic, or wireless coverage inside a building. In situations where the number of MTC devices exceeds mobile broadband user devices, SON algorithms may be steered in the wrong direction by being skewed toward optimizing performance of MTC devices to the detriment of mobile broadband user devices. As another example, airborne unmanned vehicles, such as drones, may cause antenna adjustments that are not appropriate for ground-based devices.

Implementations described herein relate to a usage category specific SONs. A usage category may be defined as a particular combination of a data type, a movement type, and a user type. A data type may correspond to a type of data being sent or received by a UE device, such as, for example, voice communication data traffic type, real-time video streaming data traffic type, real-time gaming data traffic type, buffered streaming video data traffic type, mobile broadband data traffic type, critical (e.g., emergency medical data) data traffic type, priority data traffic type, best effort data traffic type, and/or another type of data traffic. Furthermore, the data type may identify a data rate (e.g., a low data rate, a medium rate data rate, a high data rate, etc.) specified by a particular data rate sent by a UE device within a particular time period.

Movement type may correspond to a type of movement associated with the UE device. For example, UE device may be stationary, may move at a pedestrian or walking speed, may move at a vehicular speed, may be airborne, and/or may exhibit a different type of movement (e.g., a particular type of vehicular movement, such as a particular speed range, stop-and-go vs. continuous movement, etc.). A user type may correspond to a type of user class associated with the UE device. For example, UE device may correspond to an MTC device (i.e., no human user), may correspond to a single human user (e.g., a mobile phone, wearable computer device, etc.), may correspond to a multiple human users (e.g., a WiFi access point connected to the Internet using a wireless access network), and/or may correspond to a different type of user class (e.g., a number of human users within a particular range, such as one to twenty users, etc.).

For example, the usage category may corresponds to a voice usage category, a mobile broadband usage category, a mobile high speed usage category, a connected mass transit usage category, an airborne MTC usage category, a video feed MTC usage category, a stationary low data MTC device category, a best effort usage category, and/or another type of usage category.

Implementations described herein relate to identifying usage categories for UE devices, separating collection of metrics based on usage categories, and enabling different SON triggers and/or actions for different usage categories. A computer device may select a base station, obtain one or more metric values for UE devices attached to the selected base station, and determine usage categories for the UE devices attached to the selected base station. The computer device may then classify the obtained one or more metric values based on the determined usage categories, select one or more optimization actions for the selected base station based on the classified one or more metric values, and instruct the selected base station to perform the selected one or more optimization actions.

The usage categories for the UE devices may be determined by selecting a UE device attached to the selected base station, obtaining a device identifier (ID) for the selected UE device, and identifying a usage category for the selected UE device based on the obtained device ID. Additionally or alternatively, the usage categories for UE devices may be identified by determining one or more behavior patterns for the selected UE device. The one or more behavior patterns may include at least one of a performance metric value, a connectivity metric value, a service type metric value, a location or movement metric value, and/or another type of metric value.

The metric values may include, for example, an elevation of the UE device, a maximum speed of the UE device, a number of voice bearers associated with the UE device, a number of video bearers associated with the UE device, a number of users associated with the UE device, a data throughput for the UE device, a number of handovers for the UE device, a packet size variability for the UE device, a variance in packet arrival times for the UE device, a connection success rate for the UE device, a call drop rate for the UE device, a latency for the UE device, a number of unique cells reported in a time period, a number of cells changed in a time period, an error rate for the UE device, and/or another type of metric value associated with the UE device.

The one or more optimization actions may include adjusting at least one of a coverage optimization parameter, a capacity optimization parameter, a handover parameter, a neighbor list changes parameter, an antenna tilt parameter, a delay optimization parameter, a carrier optimization parameter, a random access channel parameter, and/or another type of optimization parameter.

Furthermore selecting the one or more optimization actions may include identifying a restriction associated with at least one of the determined usage categories that designates one or more parameters that are not to be adjusted and selecting not to perform an optimization action for the designated one or more parameters.

Configuring optimizations actions for particular usage categories may include selecting a usage category, selecting an optimization action associated with the usage category, and setting an optimization threshold for a metric value associated with the selected optimization action. When the set optimization threshold for the metric value is exceeded, the optimization action may be performed with respect to the selected usage category.

As an example, determining the usage category for a UE device may include determining an airborne MTC usage category based on at least one of a number of measurement reports within a first time period for the UE device exceeding a first threshold, a number of unique base station cells identified in a measurement report for the UE device exceeding a second threshold, a number of cell changes in a time period, a maximum elevation for the UE device exceeding a third threshold, or a difference between maximum and minimum elevation within a second time period for the UE device exceeding a fourth threshold; and selecting the one or more optimization actions based on the determined airborne MTC usage category may include at least one of optimizing an auxiliary tilt for an antenna associated with the selected base station, or optimizing a second component carrier associated with the selected base station.

As another example determining the usage category for a UE device may include determining a stationary low data rate MTC usage category based on at least one of a number of handovers within a time period for the UE device is zero, a maximum distance change within the time period for the UE device is less than a first threshold, or a maximum number of bytes sent or received by the UE device per attachment is less than a second threshold; and selecting the one or more optimization actions based on the determined stationary low data rate MTC usage category may include at least one of optimizing a physical random access channel associated with the selected base station or optimizing a communication delay associated with the selected base station.

As yet another example, determining the usage category for a UE device may include determining a video feed MTC usage category based on at least one of a number of video bearers set up within a time period for the UE device is zero, a packet size variability within the time period for the UE device is less than a first threshold, or a variance in packet arrival times within the time period for the UE device is less than a second threshold; and selecting the one or more optimization actions based on the determined video feed MTC usage category, wherein the one or more optimization actions include performing a capacity optimization for the selected base station.

As yet another example, determining the usage category for a UE device may include determining a connected mass transit usage category for a UE device based on determining that the UE device is associated with a number of users that is greater than a user threshold; and selecting the one or more optimization actions based on the determined connected mass transit category may include at least one of optimizing handover parameters associated with the selected base station or performing a capacity optimization for the selected base station.

In some implementations, the computer device may be included in a centralized SON system that manages a provider's wireless access network. In other implementations, some or all of the functionality of the computer device may be distributed. For example, SON functions relating to handover optimization may be performed locally by a base station or by a group of base stations, whereas SON functions relating to large parts of a network (e.g., coverage optimization) may be performed by a centralized SON system.

FIG. 1 is a diagram of an exemplary environment 100 in which systems and/or methods, described herein, may be implemented. As shown in FIG. 1, environment 100 may include UE device 110, an access network 120, and provider network 140. Access network 120 may include a base station 130 and UE device 110 may connect to access network 120 via base station 130 using wireless signals. While a single UE device 110, a single base station 130, and a single access network 120 are shown in FIG. 1 for illustrative purposes, in practice, environment 100 may include multiple UE devices 110, multiple base stations 130, and multiple access networks 120. For example, multiple UE devices 110 may be attached to base station 130 and access network 120 may include multiple base stations 130. Furthermore, a provider of communication services may manage multiple access networks 120 connected to provider network 140.

In some implementations, UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; a home appliance device; a home monitoring device; and/or any other type of computer device with wireless communication capabilities. UE device 110 may be used for voice communication, mobile broadband services (e.g., video streaming, real-time gaming, premium Internet access etc.), best effort data traffic, and/or other types of applications. Furthermore, UE device 110 may be stationary, moving at a pedestrian speed, moving at a vehicular speed, and/or moving at a different rate of speed.

In other implementations, UE device 110 may correspond to an embedded wireless device that communicates wirelessly with other devices over an M2M interface using MTC and/or another type of M2M communication. As an example, UE device 110 may be electrically connected or coupled to a sensor device, an actuator device, a microcontroller controlling one or more sensors, a microcontroller controlling one or more actuators, a microcontroller that performs data processing, and/or another type of MTC device. Examples of such devices may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or an MTC device associated with other types of data rates and/or movement.

As yet another example, UE device 110 may correspond to an unmanned aerial vehicle or an unmanned aircraft system that communicates wirelessly with other devices over an M2M interface using MTC and/or another type of M2M communication. Examples of such airborne MTC devices include consumer drone devices used for entertainment, photo or video capture, payload delivery, and/or other uses; commercial delivery drones used to deliver packages to customers; law enforcement drones used for intelligence gathering operations; and/or other types of drones or aerial devices.

In yet other implementations, UE device 110 may correspond to an access point servicing multiple devices associated with multiple users. As an example, UE device 110 may include a stationary WiFi access point located in a customer premises location or a business location. As another example, UE device 110 may include a WiFi access point that experiences movement, such as a WiFi access point located in a mass transit vehicle (e.g., a bus, a train, a trolley, a ferry, an airplane, etc.). The WiFi access point may communicate with base station 130 via wireless signals.

Access network 120 may provide access to provider network 140 for wireless devices, such as UE device 110. Access network 120 may provide mobile telephone service and/or data services to UE device 110. For example, access network 120 may establish a packet data network connection (e.g., an Internet Protocol (IP) connection) between UE device 110 and provider network 140. In some implementations, access network 120 may include a Long Term Evolution (LTE) access network (e.g., an evolved packet core (EPC) network) based on the LTE standard specified by the 3$^{rd}$ Generation Partnership Project (3GPP). In other implementations, access network 120 may include an LTE Advanced (LTE-A) access network and/or a 5G access network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CoMP); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality. In yet other implementations, access network 120 may include a Code Division Multiple Access (CDMA) access network based on, for example, a CDMA1000 standard. For example, the CDMA access network may include a CDMA enhanced High Rate Packet Data (eHRPD) network (which may provide access to an LTE access network).

As stated above, access network 120 may include a base station 130 and UE device 110 may wirelessly communicate with access network 120 via base station 130. In other words, UE device 110 may be located within the geographic area serviced by base station 130. Base station 130 may be part of an LTE eNodeB base station device and/or another LTE-A or 5G base station device. An eNodeB base station device may use the Evolved Universal Terrestrial Radio Access (E-UTRA) air interface or other air interfaces to wirelessly communicate with devices. An eNodeB base station device may include one or more devices (e.g., base stations 130) and other components and functionality that allow UE device 110 to wirelessly connect to access network 120. The eNodeB base station device may include or be associated with one or more cells. For example, each cell may include an RF transceiver facing a particular direction. The eNodeB base station device may correspond to a macrocell or to a small cell (e.g., a femtocell, a picocell, a microcell, etc.).

Provider network 140 may be managed, at least in part, by a provider of communication services associated with access network 120. Provider network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Provider network 140 may allow the delivery of Internet Protocol (IP) services to UE device 110, and may interface with other external networks. In some implementations, provider network 140 may include an Internet Protocol Multimedia Subsystem (IMS) network (not shown in FIG. 1). An IMS network may include a network for delivering IP multimedia services as specified by 3GPP or other standards/protocols and may provide media flows between UE device 110 and external IP networks or external circuit-switched networks (not shown in FIG. 1). Provider network 140 may include one or more server devices and/or network devices, or other types of computation or communication devices to manage the functionality of provider network 140. For example, provider network 140 may include a self-optimizing network (SON) system 150 and a metric system 160.

SON system 150 may include one or more devices, such as computer devices and/or server devices, which perform self-optimization functions for provider network 140. In particular, SON system 150 may optimize one or more parameters for base station 130 based on usage categories associated with UE devices 110 attached to base station 130.

Metrics system 160 may include one or more devices, such as computer devices and/or server devices, which collect metric values for metrics associated with UE devices 110. For example, metrics system 160 may receive, at particular intervals, metric values associated with UE devices 110 attached to base station 130. Metrics system 160 may classify UE devices 110 into usage categories and may classify metric values associated with particular UE devices 110 into usage categories associated with the particular UE devices 110. Metrics system 160 may provide information relating to metrics classified into usage categories to SON system 150.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100. For example, in some implementations, some or all of the functionality of metrics system 160 may be implemented in SON system 150. Additionally or alternatively, some or all of the functionality of SON system 150 may be implemented by base station 130 or by a group of base stations 130.

Figure 2:
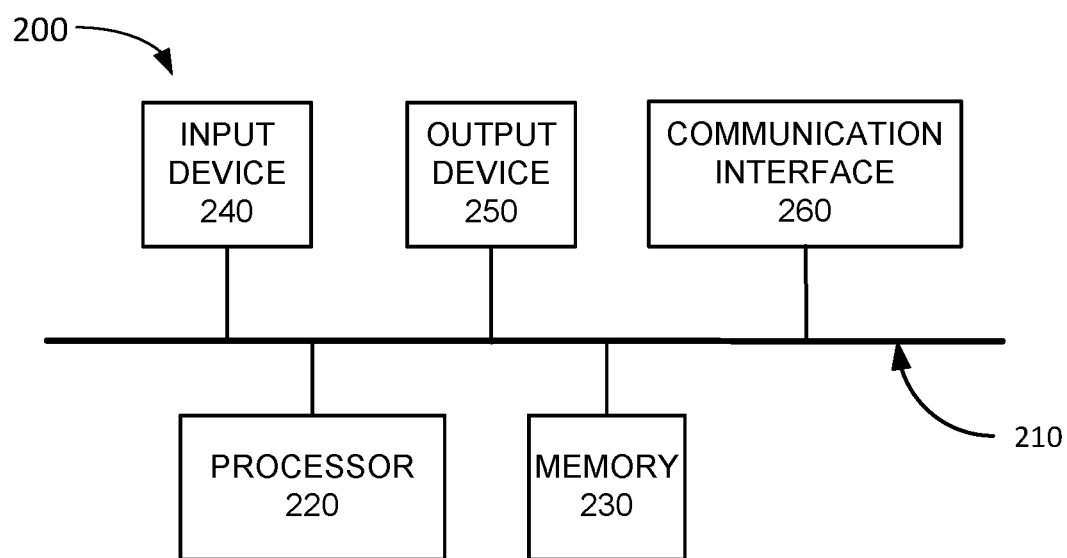
FIG. 2 is a diagram illustrating exemplary components of a device that may be included in a device or system of FIG. 1.

FIG. 2 is a diagram illustrating exemplary components of device 200 according to an implementation described herein. SON system 150, metrics system 160, base station 130, and/or UE device 110 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals. If device 200 is included in UE device 110 or base station 130, communication interface 260 may include one or more antenna assemblies. For example, each cell associated with base station 130 may include an RF transceiver and a tunable antenna assembly.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to optimization based on usage categories. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
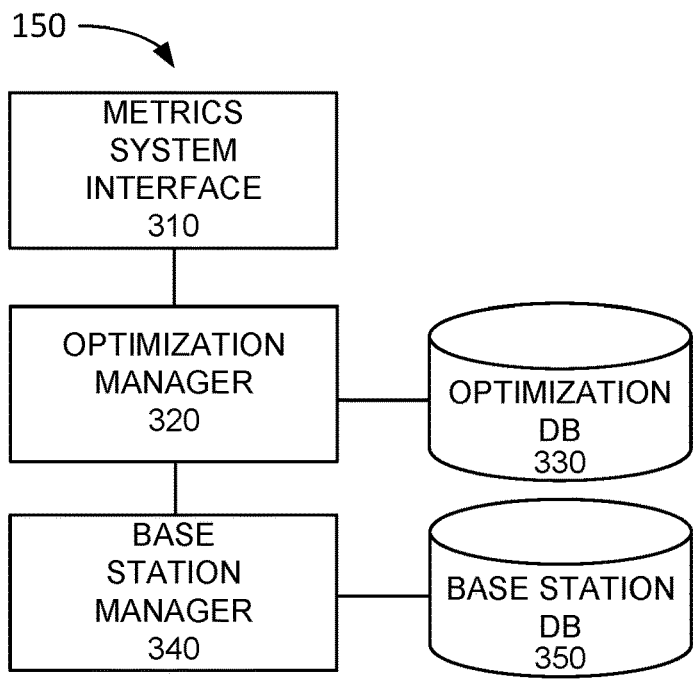
FIG. 3 is a diagram illustrating exemplary functional components of the self-optimizing network system of FIG. 1.

FIG. 3 is a diagram illustrating exemplary functional components of SON system 150. The functional components of SON system 150 may be implemented, for example, via processor 220 executing instructions from memory 230. Alternatively, some or all of the functional components included in SON system 150 may be implemented via hard-wired circuitry. As shown in FIG. 3, SON system 150 may include a metrics system interface 310, an optimization manager 320, an optimization database (DB) 330, a base station manager 340, and a base station DB 350.

Metrics system interface 310 may be configured to communicate with metrics system 160. For example, metrics system interface 310 may obtain the classified metrics information from metrics DB 420 of metrics system 160 and provide the classified metrics information to optimization manager 320. Optimization manager 320 may perform SON actions for base stations 130 based on metric values classified based on usage categories. Optimization manager 320 may obtained classified metrics information from metrics system 160, and/or from base stations 130, associated with a particular base station 130, and may select one or more optimization actions for the particular base station 130 based on information stored in optimization DB 330. Optimization DB 330 may store information relating to optimization actions associated with particular usage categories. Exemplary information that may be stored in optimization DB 330 is described below with reference to FIG. 6A.

Base station manager 340 may instruct a base station 130 to adjust one or more optimization parameters based on selections made by optimization manager 320. Base station DB 350 may store information identifying particular base stations 130 associated with access networks 120. For example, base station DB 350 may identify base stations 130 (e.g., eNodeBs) with which SON system 150 is configured to communicate and may store information on how to reach the eNodeBs and/or how to instruct the eNodeBs to adjust the optimization parameters. Furthermore, base station DB 350 may store information relating to current optimization settings associated with particular base stations 130.

Although FIG. 3 shows exemplary components of SON system 150, in other implementations, SON system 150 may include fewer components, different components, additional components, or differently arranged components than depicted in FIG. 3. Additionally or alternatively, one or more components of SON system 150 may perform one or more tasks described as being performed by one or more other components of SON system 150. Furthermore, in some implementations, some or all of the functional components of SON system 150 shown in FIG. 3 may be implemented in one or more devices of system 100, such as, for example, base station 130.

Figure 4:
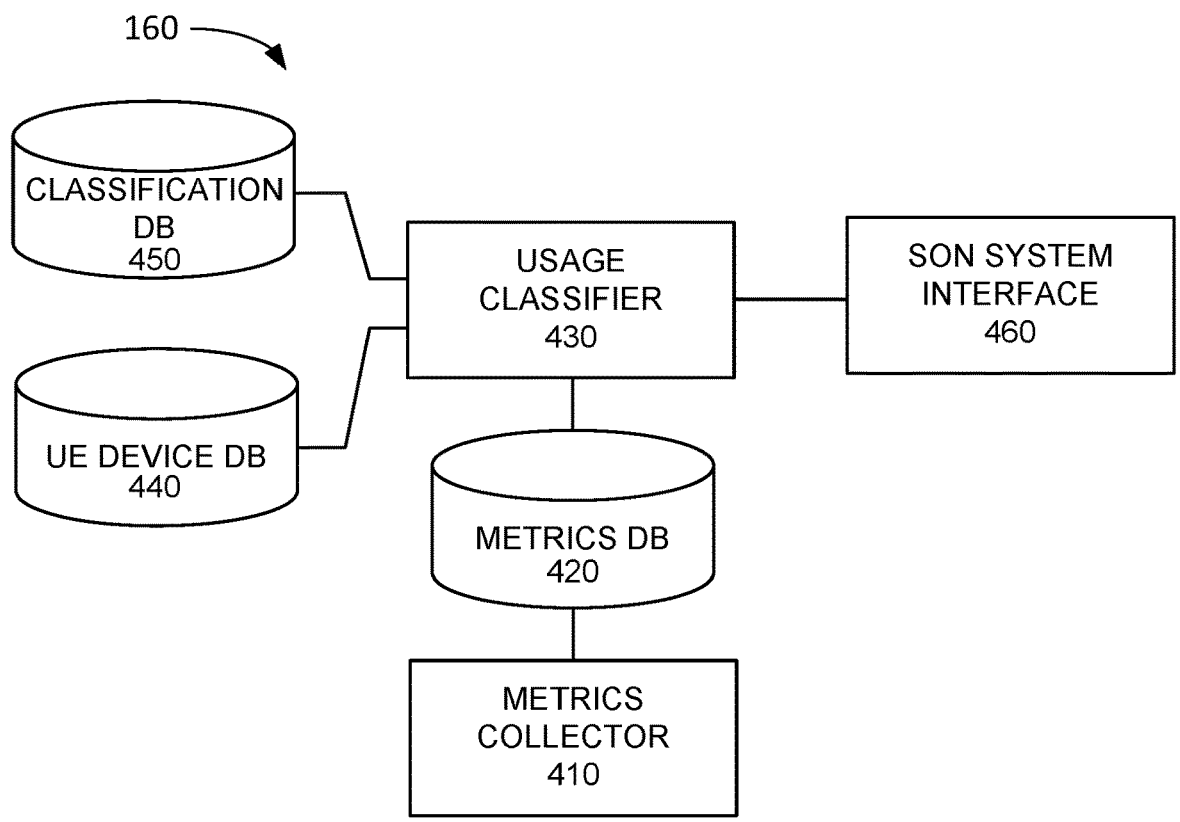
FIG. 4 is a diagram illustrating exemplary functional components of the metrics system of FIG. 1.

FIG. 4 is a diagram illustrating exemplary functional components of metrics system 160. The functional components of metrics system 160 may be implemented, for example, via processor 220 executing instructions from memory 230. Alternatively, some or all of the functional components included in metrics system 160 may be implemented via hard-wired circuitry. As shown in FIG. 4, metrics system 160 may include a metrics collector 410, a metrics DB 420, a usage classifier 430, a UE device DB 440, a classification DB 450, and a SON system interface 460.

Metrics collector 410 may collect metric values from base stations 130. As an example, base station 130 may collect metric values for UE devices 110 attached to base station 130 and may send the collected metric values to metrics collector 410 at particular intervals. As another example, metrics collector 410 may poll base stations 130 for the collected metric values at particular intervals. As yet another example, metrics collector 410 may intercept data traffic sent by base station 130 via a backhaul link to access network 120 and may collect metric values from the intercepted data traffic. Additionally or alternatively, metric collector 410 may obtain metric values for UE devices 110 attached to base station 130 from other devices in access network 120, such as a Mobility Management Entity (MME), a Packet Data Network Gateway (PGW), and/or other types of devices. Metrics DB 420 may store metrics values obtained for particular base stations 130. Exemplary information that may be stored in metrics DB 420 is described below with reference to FIG. 6B.

Usage classifier 430 may classify obtained metric values into usage categories. As an example, usage classifier 430 may classify metric values based on device or application IDs, associated with metric values obtained from base stations 130 and stored in metrics DB 420, based on information stored in UE device DB 440. UE device DB 440 may store information relating to particular UE devices. In some implementations, UE device DB 440 may store information that relates particular types of UE device IDs to usage categories. For example, a particular device ID that identifies a parking meter type may be associated with a stationary low data rate MTC device usage category. Additionally or alternatively, UE device DB 440 may store information identifying particular UE devices and relating the particular UE devices to usage categories. In some implementations, usage classifier 430 may provide a reporting application to UE devices 110 that enables UE devices 110 to provide particular device metrics to metrics system 160.

Furthermore, usage classifier 430 classify metric values, obtained from base stations 130 and stored in metrics DB 420, based on information stored in classification DB 450. Classification DB 450 may store information relating usage categories to behavior patterns. Exemplary information that may be stored in classification DB 450 is described below with reference to FIG. 6C. SON system interface 460 may be configured to communicate with SON system 150. For example, SON system interface 460 may provide classified metric values, associated with a particular base station 130 and stored in metrics DB 420, to SON system 150.

Although FIG. 4 shows exemplary components of metrics system 160, in other implementations, metrics system 160 may include fewer components, different components, additional components, or differently arranged components than depicted in FIG. 4. Additionally or alternatively, one or more components of metrics system 160 may perform one or more tasks described as being performed by one or more other components of metrics system 160.

Figure 5:
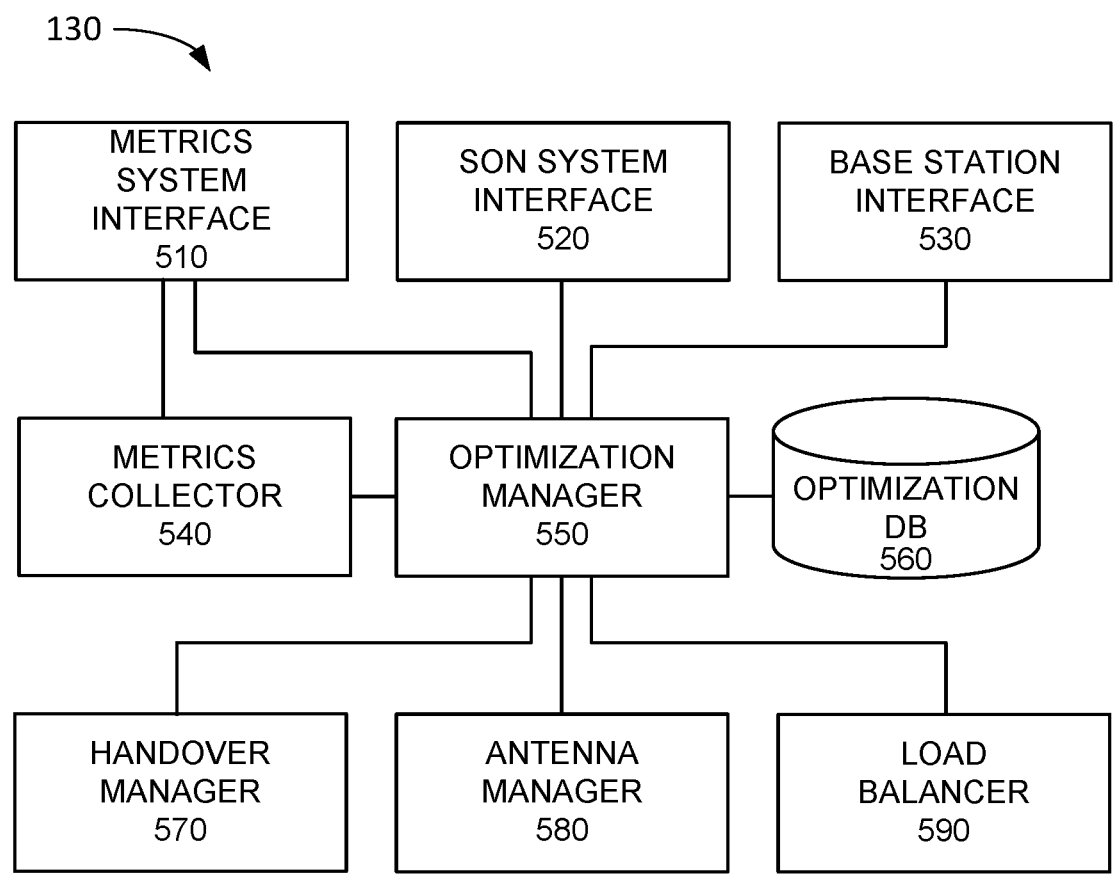
FIG. 5 is a diagram illustrating exemplary functional components of a base station of FIG. 1.

FIG. 5 is a diagram illustrating exemplary functional components of base station 130. The functional components of base station 130 may be implemented, for example, via processor 220 executing instructions from memory 230. Alternatively, some or all of the functional components included in base station 130 may be implemented via hard-wired circuitry. As shown in FIG. 5, base station 130 may include a metrics system interface 510, a SON system interface 520, a base station interface 530, a metrics collector 540, an optimization manager 550, an optimization DB 560, a handover manager 570, an antenna manager 580, and a load balancer 590.

Metrics system interface 510 may be configured to provide particular metric values, associated with UE devices 110 attached to base station 130, to metrics system 160. SON system interface 520 may be configured to receive instructions from SON system 150 relating to SON parameters to be adjusted based on optimizations selected by SON system 150. In some implementations, some SON adjustments may be selected by base station 130 (e.g., local parameters such as handover parameters, antenna tilt or direction adjustments, neighbor lists, etc.), other SON adjustments may be selected by SON system 150 (e.g., global parameters, such as coverage optimization, capacity optimization, etc.), and SON system interface 520 may communicate with SON system 150 to determine which parameter adjustments should be determined locally by optimization manager 550 and which parameters adjustments should be determined by SON system 150.

Base station interface 530 may be configured to communicate with other base stations 130. For example, some SON parameter adjustments may be based on metrics associated with a set of base stations 130 in a particular area, where base stations 130 in the area may communicate to determine such SON parameter adjustments using distributed computing. For example, base stations 130 may share neighbor lists, coordinate antenna tilts to reduce interference, and/or load balance traffic by handing over particular types of UE devices 110 to a particular base station 130 with a higher capacity.

Metrics collector 540 may collect metric values associated with UE devices 110 attached to base station 130. For example, metrics collector 540 may collect, for a UE device 110 and for a particular time interval, information relating to location and elevation of UE device 110, average and/or maximum speed of UE device 110, a number of voice bearers associated with UE device 110, a number of video bearers associated with UE device 110, a number of users associated with UE device 110, a data throughput for UE device 110, a number of handovers for UE device 110, a packet size variability for UE device 110, a variance in packet arrival times for UE device 110, a connection success rate for UE device 110, a call drop rate for UE device 110, a latency for UE device 110, a number of unique cells reported in a time period for UE device 110, a number of cells changed in a time period for UE device 110, an error rate for UE device 110, and/or other metric values.

Optimization manager 550 may adjust SON optimization parameters for base station 130. For example, optimization manager 550 may adjust one or more of a coverage optimization parameter, a capacity optimization parameter, a handover parameter, a neighbor list changes parameter, an antenna tilt or direction parameter, a delay optimization parameter, a carrier optimization parameter, a random access channel parameter, and/or another type of SON parameter. In some implementations, optimization manager 550 may receive instructions from SON system 150 via SON system interface 520. For example, SON system interface 520 may use an API to instruct optimization manager 550 to adjust one or more SON parameters. An API call by SON system interface 520 to optimization manager 550 may include, for each SON parameter to be adjusted, a SON parameter ID and a corresponding SON parameter adjustment value.

Additionally or alternatively, optimization manager 550 may determine to adjust one or more SON parameters locally based on information obtained from metrics collector 540 and/or based on information stored in optimization DB 560. Optimization DB 560 may store information relating to optimization actions associated with particular usage categories, similar to the information stored in optimization DB 330 and described below with reference to FIG. 6A. Optimization manager 550 may adjust the SON parameters for base station 130, including instructing one or more of handover manager 570, antenna manager 580, and/or load balancer 590 to perform operational parameters associated with the SON optimization determinations.

Handover manager 570 may manage handovers of UE devices 110 from base station 130 to another base station 130 and/or handovers received from other base stations 130. Handover manager 570 may maintain a set of handover parameters (e.g., event A3 parameters, such as a3offset, Hysteresisa3, timetoTriggera3, CellIndividualoffsetEutran, etc.) that are used to determine whether a particular UE device 110 should be handed over to another base station 130. Furthermore, handover manager 570 may maintain a list of neighbors identifying neighboring base stations 130.

Antenna manager 580 may manage one or more antennas associated with one or more cells of base station 130. Antenna manager 580 may perform adjustments to an antenna radiation pattern for a particular frequency band, such as, for example, mechanical tilt, remote electric tilt, auxiliary tilt, etc. Load balancer 590 may perform load balancing of traffic for base station 130. Load balancing may be performed between particular bands of base station 130, between particular cells of base station 130, and/or may include coordination of load balancing of traffic with other base stations 130.

Although FIG. 5 shows exemplary components of base station 130, in other implementations, base station 130 may include fewer components, different components, additional components, or differently arranged components than depicted in FIG. 5. Additionally or alternatively, one or more components of base station 130 may perform one or more tasks described as being performed by one or more other components of base station 130.

FIG. 6A is a diagram illustrating exemplary components of optimization DB 330. As shown in FIG. 6A, optimization DB 330 may include one or more usage category records 610. A usage category record 610 may store information relating to optimization associated with a particular usage category. Usage category record 610 may include a usage category identifier (ID) field 612, one or more action fields 620, and one or more restriction fields 630.

Usage category ID field 612 may include an identifier associated with a particular usage category. In some implementations, the usage category may be identified by a combination of identifiers. For example, a first identifier may identify a data type associated with the particular usage category, a second identifier may identify a movement type associated with the particular usage category, and a third identifier may identify a user type associated with the particular usage category. It is to be understood that the number of potential usage categories is not limited and may be revised as use cases change.

Each action field 620 may identify a particular optimization action associated with the particular usage category. For example, if the particular usage category is associated with base station 130, the optimization actions identified in action fields 620 for the particular usage category may be permitted and may be selected to be performed. Each action field 620 may include a particular optimization action and a triggering event for executing the optimization action. The triggering event may correspond to a particular threshold associated with a particular metric. As an example, an optimization action to perform coverage optimization may include a triggering event (e.g., one or more thresholds are satisfied) that specifies that coverage optimization is to be triggered if a particular number of UE devices 110 experience a particular number of dropped calls within a particular period of time. As another example, an optimization action to perform an adjustment of handover parameters may be triggered if a particular number of handover events is detected within a particular time period.

Each restriction field 630 may identify a particular optimization action that is restricted from being used in connection with a particular usage category. For example, if the particular usage category is associated with base station 130, the optimization actions identified in restriction fields 630 for the particular usage category may be prevented from being carried out. Each restriction field 630 may include a triggering event (e.g., a threshold) that may trigger the restriction to prevent the specified optimization action from being carried out.

Although FIG. 6A shows exemplary components of optimization DB 330, in other implementations, optimization DB 330 may include fewer components, different components, additional components, or differently arranged components than depicted in FIG. 6A.

FIG. 6B is a diagram illustrating exemplary components of metrics DB 420. As shown in FIG. 6B, metrics DB 420 may include one or more base station records 640. Each base station record 640 may store metric values associated with a particular base station 130. Base station record 640 may include a base station ID field 642 one or more time period records 650. Base station ID field 642 may include an identifier associated with the particular base station. Each time period record 650 may store metric value information for a particular time period. As an example, time period record 650 may store metric values information for a repeating time period, such as a particular time of day, a particular day of the week, etc. As another example, time period record 650 may store metric values information for a specific time period that occurred in the past, such as for particular time and day, for the past 24 hours, for the past hour, etc. As yet another example, a particular time period record 650 may store the most recently available metric values information. Time period record 650 may include a time period field 652 and one or more usage category records 660. Time period field 652 may identify the particular time period.

Each usage category record 660 may store metric values information for a particular usage category associated with base station 130. Usage category record 660 may store a usage category ID field 662 and one or more UE device records 670. Each UE device record 670 may store metric values for a particular UE device 110 attached to base station 130.

UE device record 670 may include a UE device field 672 and a metric values field 674. UE device field 672 may include information identifying a particular UE device 110 attached to base station 130. UE device 110 may be identified by an associated device identifier, such as a Media Access Control (MAC) address, an IP address, a Session Initiation Protocol (SIP) address; an associated subscriber telephone number, such as a Mobile Station International Subscriber Directory Number (MSISDN), an International Mobile Subscriber Identity (IMSI) number, a Mobile Directory Number (MDN); and/or by another type of device identifier. Metric values field 674 may store one or more metric values determined for UE device 110, such as metric values described above with reference to metrics collector 540.

Although FIG. 6B shows exemplary components of metrics DB 420, in other implementations, metrics DB 420 may include fewer components, different components, additional components, or differently arranged components than depicted in FIG. 6B.

Figure 6C:
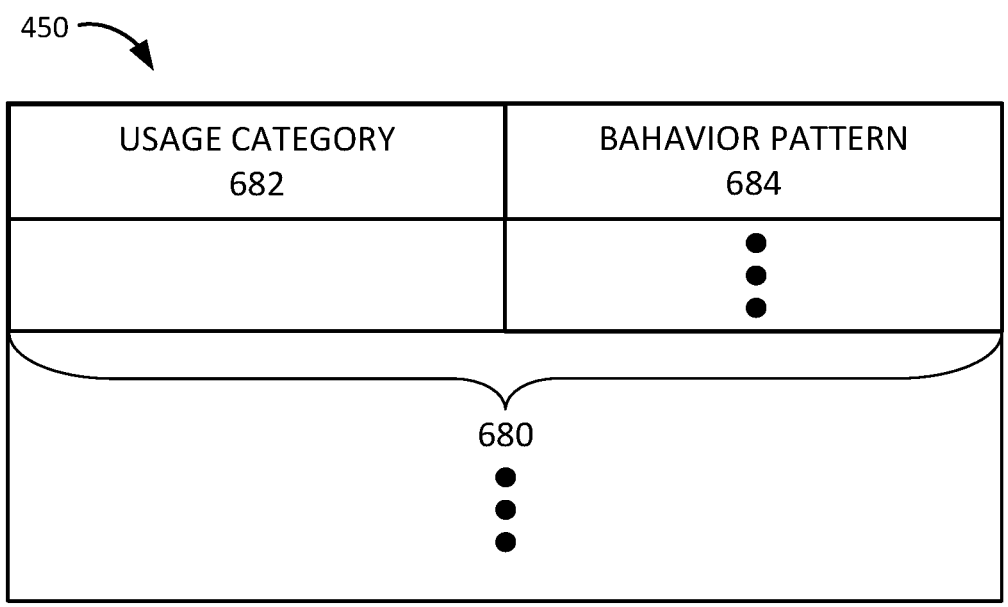
FIG. 6C is a diagram illustrating exemplary components of the classification database of FIG. 4.

FIG. 6C is a diagram illustrating exemplary components of classification DB 450. As shown in FIG. 6C, classification DB 450 may include one or more usage category records 650. A usage record 680 may store information relating to behavior patterns associated with a particular usage category. Usage category record 680 may include a usage category ID field 682 and one or more behavior pattern fields 684.

Usage category ID field 682 may store information identifying a particular usage category. Each behavior pattern field 684 may identify one or more behavior patterns associated with the particular usage category. Each behavior pattern may specify a sufficient condition for identifying UE device 110 as being associated with the particular usage category. A sufficient condition may include one or more behavior patterns that must all be satisfied in order for UE device 110 to be identified with the particular usage category. The particular usage category may be associated with multiple behavior pattern fields 684, each of which includes a sufficient condition. For example, a behavior pattern may specify, for a time period of specified duration, an average speed of UE device 110, a maximum speed of UE device 110, an elevation range of UE device 110, a number of cell changes in a time period for UE device 110, a maximum elevation of UE device 110, a number of bearers of a particular Quality of Service (QoS) class associated with UE device 110, a number of users associated with UE device 110, a data throughput for a particular QoS class associated with UE device 110, a number of handovers associated with UE device 110, a packet size variability associated with UE device 110, a variance in packet arrival times for UE device 110, a connection success rate for UE device 110, a call drop rate for UE device 110, a latency associated with UE device 110, a number of unique cells reported in a time period for UE device 110, a number of cells changed in a time period for UE device 110, an error rate associated with UE device 110, and/or another type of behavior pattern associated with a metric value or metric range for UE device 110.

Although FIG. 6C shows exemplary components of classification DB 450, in other implementations, classification DB 450 may include fewer components, different components, additional components, or differently arranged components than depicted in FIG. 6C.

Figure 7:
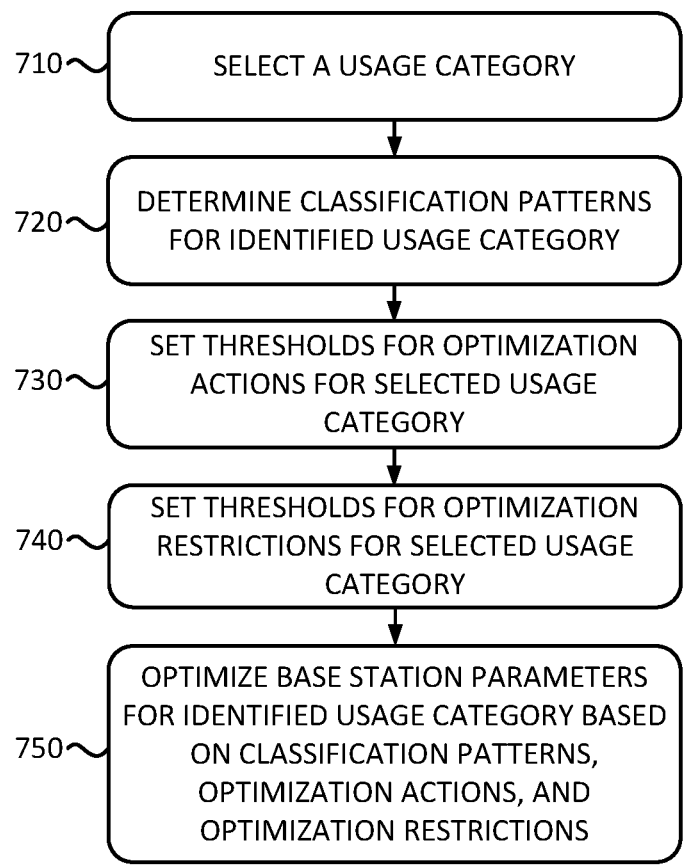
FIG. 7 is a flowchart of a process for configuring a self-optimizing network based on usage categories according to an implementation described herein.

FIG. 7 is a flowchart of a process for configuring a self-optimizing network based on usage categories according to an implementation described herein. In some implementations, the process of FIG. 7 may be performed by SON system 150 and/or metrics system 160. In other implementations, some or all of the process of FIG. 7 may be performed by another device or a group of devices separate from SON system 150 and/or metrics system 160, such as base station 130.

The process of FIG. 7 may include selecting a usage category (block 710) and determining classification patterns for the selected usage category (block 720). For example, a usage category may be designated as a combination of a data type, a movement type, and a user type. In some implementations, all possible combinations of data type, movement type, and/or user type may be designation as different usage categories. In other implementations, relevant combinations of data type, movement type, and user type may be selected to designate a usage category based on an estimated number of UE devices 110 using provider network 140 that are likely to belong to a usage category.

UE devices 110 may be categorized to a particular usage category based on a device ID. As an example, WiFi access points may be associated with particular usage categories and when a particular UE device 110 is identified as a WiFi access point, the usage category of the particular UE device 110 may be narrowed down to a subset of usage categories. As another example, particular applications may be associated with particular usage categories. Thus, when a particular UE device 110 is detected as using a particular application (e.g., based on an application ID included in a message sent by the particular UE device 110), the particular UE device 110 may be associated with a usage category based on the particular application. As yet another example, UE devices 110 may be configured to signal a device identifier whenever communicating via access network 120.

Furthermore, behavior patterns for usage categories may be determined and stored in classification DB 450. Behavior patterns may be determined based on empirical observation, based on expected behavior of UE devices 110 associated with a usage category, based on SON optimization requirements selected for a particular usage category, and/or based on another criterion.

Thresholds for optimization actions for the selected usage category may be set (block 730). For example, for each optimization action associated with a usage category, one or more metric values may be selected and associated with threshold values. If a threshold value is exceeded, the optimization action may be selected to be performed. Thresholds for optimization restrictions for the selected usage category may be set (block 740). For example, a restriction may be associated with a particular usage category that may restrict a particular optimization action from being performed if a threshold in a particular metric is reached.

Base station parameters may be optimized based on the usage categories, the optimization actions, and the optimization restrictions (block 750). For example, SON system 150 may use the determined usage categories, the determined behavior patterns, and the selected optimization actions and restrictions to perform SON optimization actions on base stations 130, as described below with reference to FIG. 8.

Figure 8:
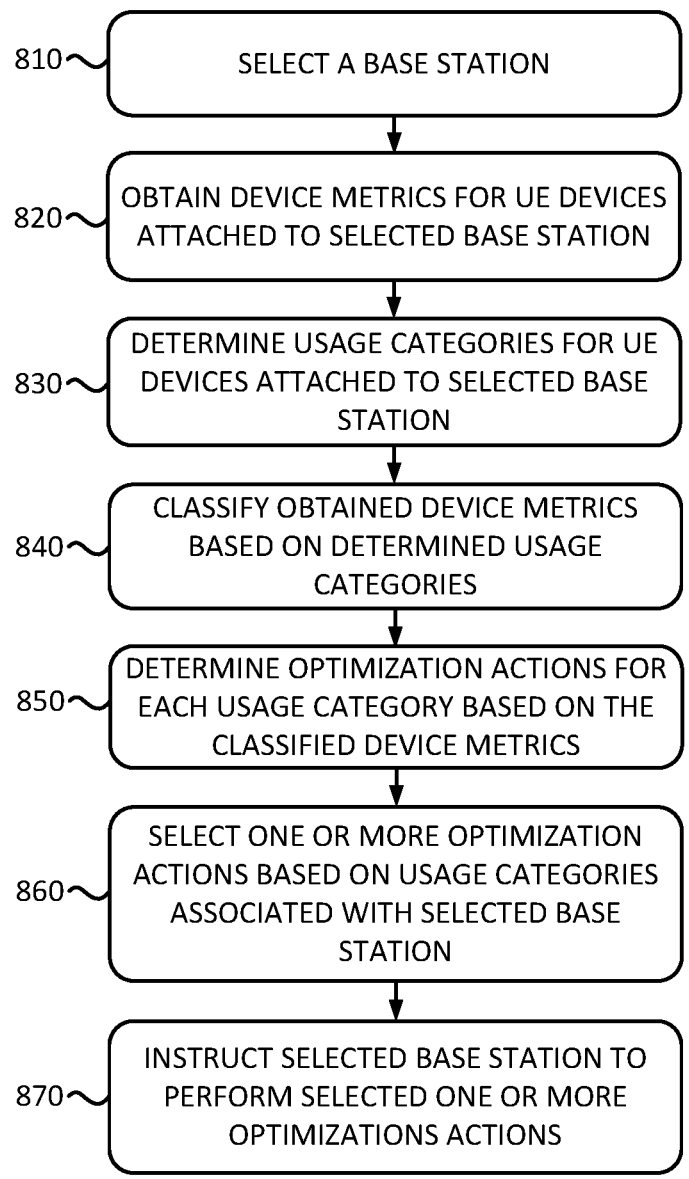
FIG. 8 is a flowchart of a process for self-optimization based on usage categories according to an implementation described herein.

FIG. 8 is a flowchart of a process for self-optimization based on usage categories according to an implementation described herein. In some implementations, the process of FIG. 8 may be performed by SON system 150 and/or metrics system 160. In other implementations, some or all of the process of FIG. 8 may be performed by another device or a group of devices separate from SON system 150 and/or metrics system 160, such as base station 130.

The process of FIG. 8 may include selecting a base station (block 810), obtaining device metrics for UE devices attached to the base station (block 820), and determine usage categories for the UE devices attached to the selected base station (block 830). Metrics system 160 may collect metrics, relating to attached UE devices 110, from base stations 130 at particular intervals. UE devices 110 attached to base station 130 may be classified into usage categories based on identifiers associated with UE devices 110 and stored in UE device DB 440, based on behavior patterns associated with UE devices and stored in classification DB 450, and/or based on a combination of an identifier and a behavior patterns.

The identifiers may correspond to device identifiers, communication protocol identifiers, application identifiers, subscriber identifiers, and/or other types of identifiers. SON system 150 may select a particular base station 130 included in the set of base stations managed by SON 150, and may retrieve the classified metric values associated with the selected base station 130 from metrics DB 420.

The obtained device metrics may be classified based on the determined usage categories (block 840) and optimization actions may be determined for each usage category based on the classified device metrics (block 850). For example, metrics system 160 may classify the obtained metric values based on the determined usage categories associated with UE devices 110 and may enable SON system 150 to access the classified metric values stored in metrics DB 420. SON system 150 may determine usage categories associated with base station 130 and may access optimization DB 560 to determine optimization actions to be performed for base station 130.

One or more optimization actions based on the usage categories associated with the base station may be selected (block 860) and the selected base station may be instructed to perform the selected one or more optimization actions (block 870). As an example, SON system 150 may check to see if a triggering event for an optimization action for a particular usage category is satisfied in optimization DB 330 and to make sure a restriction for the optimization action has not been activated. As another example, base station 130 may locally check whether a triggering event in optimization DB 560 has been satisfied for a particular usage category and to make sure a restriction for the optimization action has not been activated. The selected base station 130 may then be instructed to perform the selected one or more optimization actions.

In some situations, a conflict may exist between different usage categories. For example, base station 130 may be associated with multiple usage categories and different usage categories may indicate different, and possibly conflicting optimization actions. In such situations, optimization DB 330 or 560 may specify priorities for particular optimization actions and/or usage categories. As an example, usage categories associated with users may be given priority over usage categories associated with MTC devices. As another example, a usage category associated with a higher number of UE devices 110 may be given priority over another usage category with a lower number of UE devices 110. As yet another example, optimization actions to be performed may be computed based on a weighted average of the usage categories associated with base station 130. Different situations may be associated with different weights. For example, usage categories associated with vehicular speeds may be given higher weights during rush hours.

FIG. 9 is a diagram of an exemplary set 900 of behavior patterns for different usage categories according to an implementation described herein. The behavior patterns shown in FIG. 9 may be used to identify a particular usage category in place of, or in addition to, a UE device ID (e.g., MAC address, IP address, MDN, etc.) associated with UE device 110. As shown in FIG. 9, set 900 may include a voice usage category 910, a mobile broadband usage category 920, a mobile high speed usage category 930, a connected mass transit usage category 940, an airborne MTC device usage category 950, a video feed MTC device usage category 960, a stationary low rate MTC device usage category 970, and a best effort usage category 980.

Voice usage category 910 may correspond to UE device 110 with an active voice QoS class bearer, indicating that user is using UE device 110 for voice communication. Voice usage category 910 may be identified if the number of voice bearers in the last N attempts at setting up a bearer by UE device 110 is greater than zero. Mobile broadband usage category 920 may correspond to UE device 110 with an active bearer that is not a voice bearer, but that is a higher QoS class than a best effort bearer (e.g., streaming video, real-time gaming, high priority data, etc.) and may be identified if the number of non-voice high QoS bearers in the last N attempts at setting up a bearer is greater than zero.

Mobile high speed usage category 930 may correspond to UE device 110 moving at vehicular speeds, such as a user with a mobile phone in a vehicle and may be identified if UE device 110 is associated with a maximum distance per change of time that is higher than a threshold $T_1$. Connected mass transit usage category 940 may correspond to UE device 110 that is a WiFi access point in a mass transit vehicle, such as a bus or a train, and may be identified if UE device 110 is associated with a maximum distance per change of time that is higher than a threshold $T_2$ and if the number of different users associated with UE device 110 is higher than a threshold $T_3$. The number of different users may be identified by, for example, the number of different IP addresses associated with UE device 110, the number of different bearers associated with UE device 110, the number of different active application sessions associated with UE device 110, and/or based on a different technique.

Airborne MTC device usage category 950 may correspond a UE device 110 that is an unmanned aerial vehicle, such as a drone. Airborne MTC device usage category 950 may be identified if the number of measurement reports (sent to determine whether a handover should occur) per unit time is greater than a threshold $T_4$, or the number of unique cells in a measurement report is greater than a threshold $T_5$, or the maximum elevation is greater than a threshold $T_6$, or the change in elevation (measured as the difference between a maximum and a minimum elevation) is greater than a threshold $T_7$. Thus, in this example, four different behavior patterns may be used to identify UE device 110 as associated with an airborne MTC device usage category 950.

Video feed MTC device usage category 960 may correspond to an MTC device that provides a wireless signal feed of video signals captured by a video camera. Video feed MTC device usage category 960 may be identified if the number of voice bearers in the last N attempts at establishing a bearer are zero, and if the packet size variability is less than or equal to a threshold $T_8$, and if the variance in packet arrival times is less than a threshold $T_9$. Thus, in this example, three different behavior patterns must be satisfied to identify UE device 110 as associated with a video feed MTC device usage category 960.

Stationary low rate MTC device usage category 970 may correspond to a low data rate stationary MTC device, such as a parking meter, a utility meter, a road sensor, a smart street light, etc. Stationary low rate MTC device usage category 970 may be identified if the number of handovers per unit time is less than a threshold $T_{10}$, and if the maximum distance change per unit time is less than a threshold $T_{11}$, and if the maximum number of bytes sent per attach request is less than a threshold $T_{12}$. Thus, in this example, three different behavior patterns must be satisfied to identify UE device 110 as associated with a stationary low rate MTC device usage category 970. Best effort usage category 980 may correspond to a device that only sends and receives data identified as best effort QoS class. Best effort usage category 980 may be identified if the number of voice and other high QoS bearers in the last N attempts corresponds to zero.

Figure 10:
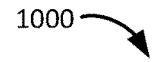
FIG. 10 is a diagram of an exemplary set of optimization actions for different usage categories according to an implementation described herein.

FIG. 10 is a diagram of an exemplary set 1000 of optimization actions for different usage categories according to an implementation described herein. As shown in FIG. 10, set 1000 may include a voice usage category optimization action set 1010, a mobile broadband usage category optimization action set 1020, a mobile high speed usage category optimization action set 1030, a connected mass transit usage category optimization action set 1040, an airborne MTC device usage category optimization action set 1050, a video feed MTC device usage category optimization action set 1060, a stationary low rate MTC device usage category optimization action set 1070, and a best effort usage category optimization action set 1080.

Voice usage category optimization action set 1010 may include coverage optimization. Coverage optimization may include adjusting the RF parameters (e.g., transmit power, antenna azimuth, antenna beam width, downlink or uplink band selection, etc.) of one or more adjacent cells of base station 130 to optimize coverage in a particular area. Additionally or alternatively, coverage optimization may be coordinated between cells of adjacent base stations 130.

Mobile broadband usage category optimization action set 1020 may include remote electric tilt adjustments, neighbor list changes, and handover parameter changes. Thus, if base station 130 is associated with a mobile broadband usage category, adjustments to antenna remote electric tilt may be permitted and performed when a determination is made that the remote electric tilt is to be adjusted to optimize performance.

Mobile high speed usage category optimization action set 1030 may include handover parameter changes. Thus, if base station 130 is associated with a mobile high speed usage category, handover parameter changes may be permitted and performed when a determination is made that performance would be improved by adjusting the handover parameters.

Connected mass transit usage category optimization action set 1040 may include handover parameter changed and capacity optimization. Capacity optimization may include load balancing of traffic of particular QoS classes across multiple cells and/or across multiple base stations 130. Thus, if base station 130 is associated with a connected mass transit usage category, handover parameter changes and capacity optimization may be permitted and performed when a determination is made that performance would be improved by adjusting the handover parameters or by adjusting the capacity of base station 130.

Airborne MTC device usage category optimization action set 1050 may include antenna auxiliary tilt and secondary carrier optimization. Antenna auxiliary tilt adjustment and/or changing a secondary component carrier in a carrier aggregation scheme may improve coverage at higher elevation. Thus, if base station 130 is associated with an airborne MTC device usage category, antenna auxiliary tilt and secondary carrier optimization may be permitted and performed when a determination is made that performance would be improved by adjusting the antenna auxiliary beam tilt or changing the secondary component carrier.

Video feed MTC device usage category optimization action set 1060 may include capacity optimization. Thus, if base station 130 is associated with a video feed MTC usage category, capacity optimization may be permitted and performed when a determination is made that performance would be improved by adjusting the capacity of base station 130.

Stationary low rate MTC device usage category optimization action set 1070 may include physical random access channel (PRACH) optimization and delay optimization. A PRACH may be used for initiation of a random access procedure, which is used to initiate a data transfer. Stationary low rate MTC devices may utilize a PRACH to initiate a data transfer. PRACH optimization may include optimizing parameters associated with a PRACH, such as power control parameters (e.g., initial transmission power, change in transmit power on subsequent attempts, number of attempts, etc.) for a PRACH. Delay optimization may be associated with a discontinuous reception (DRX) mode used by stationary low rate MTC devices. A UE device 110 in DRX mode may be in a power saving mode and may need to wake up before communication with base station 130. Thus, a tradeoff may exist before delay and power saving. Delay optimization may include adjusting DRX parameters (e.g., DRX inactivity timer, DRX cycle timer, DRX retransmission timer, etc.) to balance power saving benefits with communication delays. Thus, if base station 130 is associated with a stationary low rate MTC usage category, PRACH and delay optimization may be permitted and performed when a determination is made that performance would be improved by adjusting the PRACH or delay parameters. Best effort usage category optimization action set 1080 may be empty, as SON system 150 may determine that best effort traffic should not drive optimization While FIGS. 9 and 10 depict a set of usage categories for illustration purposes, in practice, the set of usage categories may include fewer usage categories, different usage categories, or additional usage categories. For example, any combination of data type, movement type, and user type may be designated as a usage category. Other examples of usage categories include a stationary WiFi access point usage category, an airborne WiFi usage category, a pedestrian speed MTC device usage category, a vehicular speed MTC usage category, a vehicular speed video feed MTC usage category, a pedestrian speed critical data MTC device (e.g., a wearable health monitoring device) usage category, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   selecting, by a computer device, a base station;
   obtaining, by the computer device, one or more metric values for user equipment (UE) devices attached to the selected base station;
   determining, by the computer device, usage categories for one or more of the UE devices attached to the selected base station, wherein a usage category identifies a particular combination of a data type, a movement type, and a user type associated with a particular UE device, wherein the user type indicates whether the particular UE device is associated with no human user, a single human user, or multiple human users;
   classifying, by the computer device, the obtained one or more metric values based on the determined usage categories;
   selecting, by the computer device, one or more optimization actions for the selected base station based on the classified one or more metric values; and
   instructing, by the computer device, the selected base station to perform the selected one or more optimization actions.

2. The method of claim 1, wherein determining the usage categories for one or more of the UE devices attached to the selected base station includes:
   selecting a UE device attached to the selected base station;
   determining one or more behavior patterns for the selected UE device; and
   wherein determining a usage category for the selected UE device is based on the determined one or more behavior patterns.

3. The method of claim 2, wherein the one or more behavior patterns include a condition for identifying the particular UE device as being associated with a particular usage category.

4. The method of claim 2, wherein the one or more behavior patterns include at least one of a performance metric value, a connectivity metric value, a service type metric value, or a location or movement metric value.

5. The method of claim 4, wherein the one or more behavior patterns include at least one of:
   an elevation of the UE device;
   a maximum speed of the UE device;
   a number of unique cells reported in a time period;
   a number of cells changed in a time period; or
   a number of handovers for the UE device.

6. The method of claim 4, wherein the one or more behavior patterns include at least one of:
   a number of voice bearers associated with the UE device;
   a number of video bearers associated with the UE device; or
   a number of users associated with the UE device.

7. The method of claim 4, wherein the one or more behavior patterns include at least one of:
   a data throughput for the UE device;
   a packet size variability for the UE device;
   a variance in packet arrival times for the UE device;
   a connection success rate for the UE device;
   a call drop rate for the UE device;
   a latency for the UE device; or
   an error rate for the UE device.

8. The method of claim 2, wherein determining the usage categories for one or more of the UE devices attached to the selected base station further includes:
   selecting a UE device attached to the selected base station;
   obtaining a device identifier for the selected UE device; and
   identifying a usage category for the selected UE device based on the obtained device identifier.

9. The method of claim 1, wherein the usage categories include at least one of:
   a voice usage category;
   a mobile broadband usage category;
   a mobile high speed usage category;
   a connected mass transit usage category;
   an airborne Machine-Type Communication (MTC) usage category;
   a video feed MTC usage category;
   a stationary low data MTC device category; or
   a best effort usage category.

10. The method of claim 1, wherein the one or more optimization actions for the selected base station includes an adjustment to at least one of:
   a coverage optimization parameter;
   a capacity optimization parameter;
   a handover parameter;
   a neighbor list changes parameter;
   an antenna tilt parameter;
   a delay optimization parameter;
   a carrier optimization parameter; or
   a random access channel parameter.

11. The method of claim 1, wherein selecting the one or more optimization actions for the selected base station based on the classified one or more metric values includes:
   identifying a restriction associated with at least one of the determined usage categories, wherein the restriction designates one or more parameters that are not to be adjusted; and
   selecting to not perform an optimization action for the designated one or more parameters.

12. The method of claim 1, further comprising:
   selecting a usage category;
   selecting an optimization action associated with the usage category; and
   setting an optimization threshold for a metric value associated with the selected optimization action, wherein the optimization action is to be performed with respect to the selected usage category when the optimization threshold for the metric value is exceeded.

13. A computer device comprising:
   a memory configured to store instructions; and
   a processor configured to execute the instructions to:
      select a base station;
      obtain one or more metric values for user equipment (UE) devices attached to the selected base station;
      determine usage categories for particular ones of the UE devices attached to the selected base station, wherein a usage category identifies a particular combination of a data type, a movement type, and a user type associated with a particular UE device, wherein the user type indicates whether the particular UE device is associated with no human user, a single human user, or multiple human users;
      classify the obtained one or more metric values based on the determined usage categories;
      select one or more optimization actions for the selected base station based on the classified one or more metric values; and
      instruct the selected base station to perform the selected one or more optimization actions.

14. The computer device of claim 13, wherein, when determining the usage categories for one or more of the UE devices attached to the selected base station, the processor is further configured to:
   select a UE device attached to the selected base station;
   determine one or more behavior patterns for the selected UE device; and
   wherein the processor is configured to determine a usage category for the selected UE device based on the determined one or more behavior patterns.

15. The computer device of claim 14, wherein the one or more behavior patterns include at least one of a performance metric value, a connectivity metric value, a service type metric value, or a location or movement metric value.

16. The computer device of claim 15, wherein the one or more behavior patterns include at least one of:
   an elevation of the UE device;
   a maximum speed of the UE device;
   a number of unique cells reported in a time period;
   a number of cells changed in a time period;
   a number of handovers for the UE device;
   a number of voice bearers associated with the UE device;
   a number of video bearers associated with the UE device;
   a number of users associated with the UE device;
   a data throughput for the UE device;
   a packet size variability for the UE device;
   a variance in packet arrival times for the UE device;
   a connection success rate for the UE device;
   a call drop rate for the UE device;
   a latency for the UE device; or
   an error rate for the UE device.

17. The computer device of claim 13, wherein the usage categories include at least one of:
   a voice usage category;
   a mobile broadband usage category;
   a mobile high speed usage category;
   a connected mass transit usage category;
   an airborne Machine-Type Communication (MTC) usage category;
   a video feed MTC usage category;
   a stationary low data MTC device category; or
   a best effort usage category.

18. The computer device of claim 13, wherein the one or more optimization actions for the selected base station includes an adjustment to at least one of:
   a coverage optimization parameter;
   a capacity optimization parameter;
   a handover parameter;
   a neighbor list changes parameter;
   an antenna tilt parameter;
   a delay optimization parameter;
   a carrier optimization parameter; or
   a random access channel parameter.

19. The computer device of claim 13, wherein the processor is further configured to:
   select a usage category;
   select an optimization action associated with the usage category; and
   set an optimization threshold for a metric value associated with the selected optimization action, wherein the optimization action is to be performed with respect to the selected usage category when the optimization threshold for the metric value is exceeded.

20. A system comprising:
   a base station configured to provide a wireless connection to a wireless communication device; and
   a network optimizing device configured to:
      obtain one or more metric values for user equipment (UE) devices attached to the base station;
      determine usage categories for particular ones of the UE devices attached to the base station, wherein a usage category identifies a particular combination of a data type, a movement type, and a user type associated with a particular UE device, wherein the user type indicates whether the particular UE device is associated with no human user, a single human user, or multiple human users;
      classify the obtained one or more metric values based on the determined usage categories;
      select one or more optimization actions for the base station based on the classified one or more metric values; and instruct the base station to perform the selected one or more optimization actions.

\* \* \* \* \*